United States Patent
Yukawa

(10) Patent No.: US 10,673,298 B2
(45) Date of Patent: Jun. 2, 2020

(54) ELECTRIC MOTOR PROVIDED WITH STATOR-INTEGRATED HOUSING

(71) Applicant: FANUC CORPORATION, Yamanashi (JP)

(72) Inventor: Fumito Yukawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 61 days.

(21) Appl. No.: 15/983,663

(22) Filed: May 18, 2018

(65) Prior Publication Data
US 2018/0351429 A1    Dec. 6, 2018

(30) Foreign Application Priority Data

Jun. 1, 2017   (JP) .................................. 2017-109274

(51) Int. Cl.
*H02K 5/02*      (2006.01)
*H02K 5/10*      (2006.01)
(Continued)

(52) U.S. Cl.
CPC .............. *H02K 5/10* (2013.01); *H02K 1/185* (2013.01); *H02K 5/02* (2013.01); *H02K 1/18* (2013.01); *H02K 5/04* (2013.01)

(58) Field of Classification Search
CPC .. H02K 5/15; H02K 5/04; H02K 5/02; H02K 5/06; H02K 1/18; H02K 1/185; H02K 5/24
(Continued)

(56) References Cited

U.S. PATENT DOCUMENTS 1,822,342 A * 9/1931 Ehrlich ..................... H02K 5/15
                                                        310/91
1,918,763 A * 7/1933 Lincoln .................... H02K 9/14
                                                        310/57
(Continued)

FOREIGN PATENT DOCUMENTS

CN       104702001 A  *  6/2015
CN       208461585 U     2/2019
(Continued)

OTHER PUBLICATIONS

JP-63283440-A (English Translation) (Year: 1988).*
CN-104702001-A (English Translation) (Year: 2017).*

*Primary Examiner* — Alfonso Perez Borroto
*Assistant Examiner* — Alexander Moraza
(74) *Attorney, Agent, or Firm* — RatnerPrestia

(57) ABSTRACT

An electric motor includes: a rotor; a stator disposed on an outer peripheral side of the rotor; a front-side housing provided with an opening housing a part of the rotor; a rear-side housing clamping the stator between the rear-side housing and the front-side housing; a plurality of fastening members fastening the stator, the front-side housing, and the rear-side housing together; and an annular portion disposed on a surface, of the front-side housing, the surface facing the stator and having an annular shape that surrounds the opening, wherein respective heights of first sections of the annular portion that are in the vicinity of insertion holes of the fastening members are lower than respective heights of second sections, which are positioned at middle points between an adjacent pair of the first sections, among the first sections, the intermediate point is close to the adjacent pair of the first sections.

10 Claims, 11 Drawing Sheets

(51) Int. Cl.
*H02K 5/04* (2006.01)
*H02K 1/18* (2006.01)

(58) Field of Classification Search
USPC ...... 310/89, 400–433, 216.114, 216.118, 51, 310/88
See application file for complete search history.

(56) References Cited

U.S. PATENT DOCUMENTS

| | | | |
|---|---|---|---|
| 6,188,156 B1* | 2/2001 | Maldeney | H02K 5/15 29/596 |
| 6,249,066 B1 | 6/2001 | Ikegami et al. | |
| 2001/0024071 A1* | 9/2001 | Yoshida | H02K 5/15 310/201 |
| 2006/0255666 A1* | 11/2006 | Williams | H02K 5/24 310/51 |
| 2007/0063593 A1* | 3/2007 | Braun | H02K 1/20 310/58 |
| 2010/0301691 A1* | 12/2010 | Cors | H02K 5/1677 310/83 |
| 2013/0026887 A1* | 1/2013 | Miyahara | H02K 5/15 310/402 |
| 2018/0351429 A1 | 12/2018 | Yukawa | |

FOREIGN PATENT DOCUMENTS

| | | | |
|---|---|---|---|
| JP | S57183045 U | | 11/1982 |
| JP | 63283440 A | * | 11/1988 |
| JP | H05-049200 A | | 2/1993 |
| JP | H0631376 U | | 4/1994 |
| JP | H1066292 A | | 3/1998 |
| JP | 2000201468 A | | 7/2000 |

\* cited by examiner

ELECTRIC MOTOR PROVIDED WITH STATOR-INTEGRATED HOUSING

This application is a new U.S. patent application that claims benefit of JP 2017-109274 filed on Jun. 1, 2017, the content of 2017-109274 is incorporated herein by reference.

BACKGROUND OF THE INVENTION

1. Field of the Invention

The present disclosure relates to an electric motor, and in particular, to an electric motor provided with a housing integrated with a stator.

2. Description of the Related Art

Up until now, an induction motor provided with a stator-integrated housing is known (for example, Japanese Unexamined Patent Publication (Kokai) No. JP H05-49200 A). This stator-integrated housing of the related art is provided with a stator core disposed on an outer peripheral side of a motor, and a rear bracket that clamps the stator core between a front flange disposed on the front side of the motor in the axial direction, and a rear bracket disposed on the rear side of the motor in the axial direction. Eight screw holes are provided at substantially equal intervals in the vicinity of an outer periphery of a rear surface side of the front flange. Open holes that extend in the axial direction are provided in the stator core, corresponding to the screw holes. Through holes that extend in the axial direction are provided in the rear bracket, in positions corresponding to the screw holes and the open holes. Eight tie-bolts are inserted through and screwed into the through holes, the open holes, and the screw holes, from the rear bracket side, and the rear bracket, the stator core, and the front flange are firmly fixed in an integrated manner.

In the induction motor provided with the stator-integrated housing, a contact surface between the stator and the housing is provided conforming to a shape of the stator. However, an area pressing the stator is large, and with current bolt tightening methods, it is not possible to form a complete seal between the stator and the housing, and it is difficult to inhibit the infiltration of cutting fluid, etc., from a gap therebetween.

SUMMARY OF THE INVENTION

In light of the foregoing, an object of the present disclosure is to provide an electric motor capable of inhibiting the infiltration of cutting fluid, etc., from a gap between a stator and a housing.

An electric motor according to an example of the present disclosure includes: a rotor; a stator disposed on an outer peripheral side of the rotor; a front-side housing disposed on one side of the stator and provided with an opening housing a part of the rotor; a rear-side housing disposed on another side of the stator, the stator is clamped between the rear-side housing and the front-side housing; a plurality of fastening members fastening the stator, the front-side housing, and the rear-side housing together; and an annular portion disposed on a surface, of the front-side housing, the surface facing the stator and the annular portion having an annular shape that surrounds the opening, wherein respective heights of a plurality of first sections of the annular portion that are in the vicinity of insertion holes of the plurality of fastening members are lower than respective heights of a plurality of second sections, each of which is positioned at a middle point between an adjacent pair of the first sections, among the first sections, the middle point is close to the adjacent pair of the first sections.

BRIEF DESCRIPTION OF THE DRAWINGS

The objects, features and advantages of the disclosure will become more apparent from the following description of the embodiments in connection with the accompanying drawings, wherein.

DETAILED DESCRIPTION

Hereinafter, an electric motor according to the present disclosure is described with reference to the drawings. The technological scope of the present disclosure is not limited to the embodiments herein, and attention is drawn to the fact that the technological scope covers the disclosure described in the scope of the claims and equivalents thereof.

Figure 1:
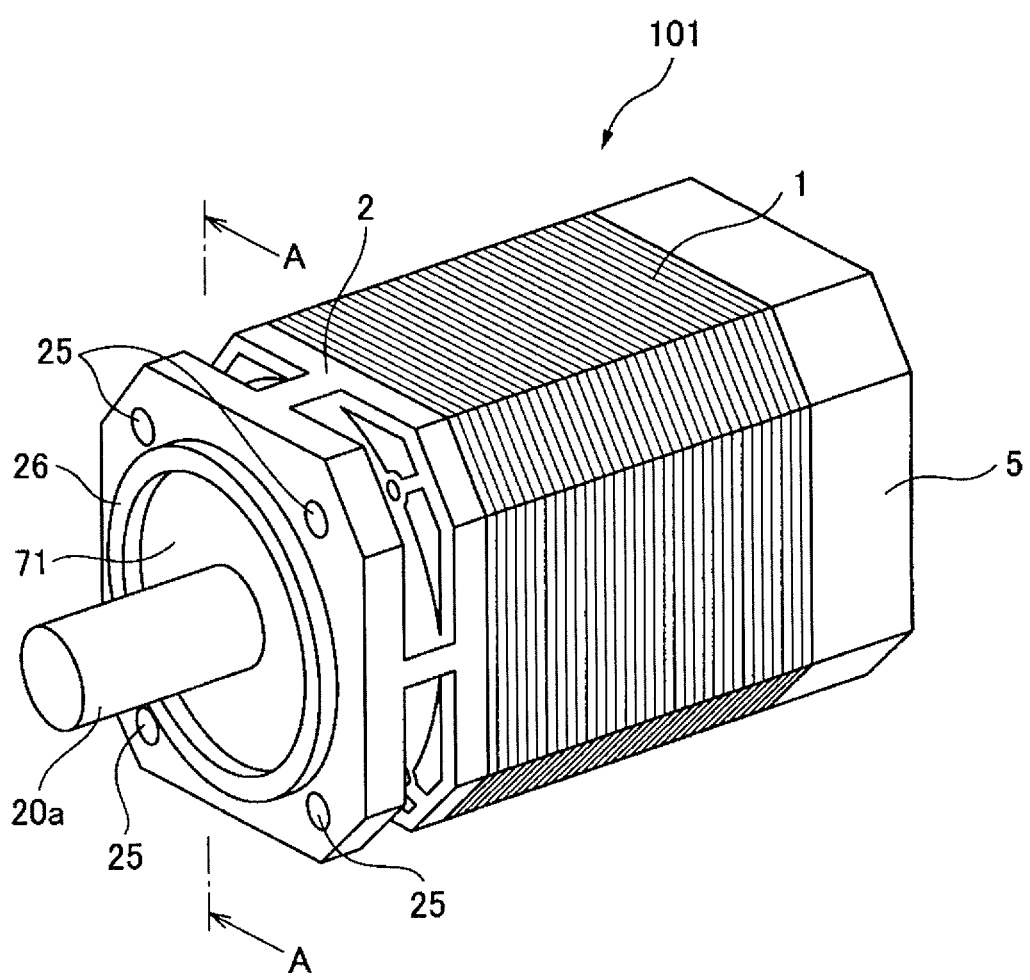
FIG. 1 is a perspective view of an electric motor according to Example 1.

First, an electric motor according to a first embodiment is described. FIG. 1 is a perspective view of the electric motor according to the first embodiment. An electric motor 101 is provided with a rotor (not illustrated), a stator 1 disposed on an outer peripheral side of the rotor, a front-side housing 2 that is disposed on one side of the stator 1 and that includes an opening housing a part of the rotor, and a rear-side housing 5 that is disposed on the other side of the stator 1 and that clamps the stator 1 between the rear-side housing 5 and the front-side housing 2. The stator 1 has a structure in which a plurality of electromagnetic steel sheets are layered.

The electric motor 101 is fixed to a machine (not illustrated) that is to be driven, using attachment bolt holes 25 provided in four corners of the front-side housing 2. Further, an annular protrusion 26 is fitted into a mounting opening on the machine side, and the machine is driven by an output axis 20a of the rotor. The electric motor 101 is not limited to a flange mounting type like this and may be a foot mounting type.

Figure 2:
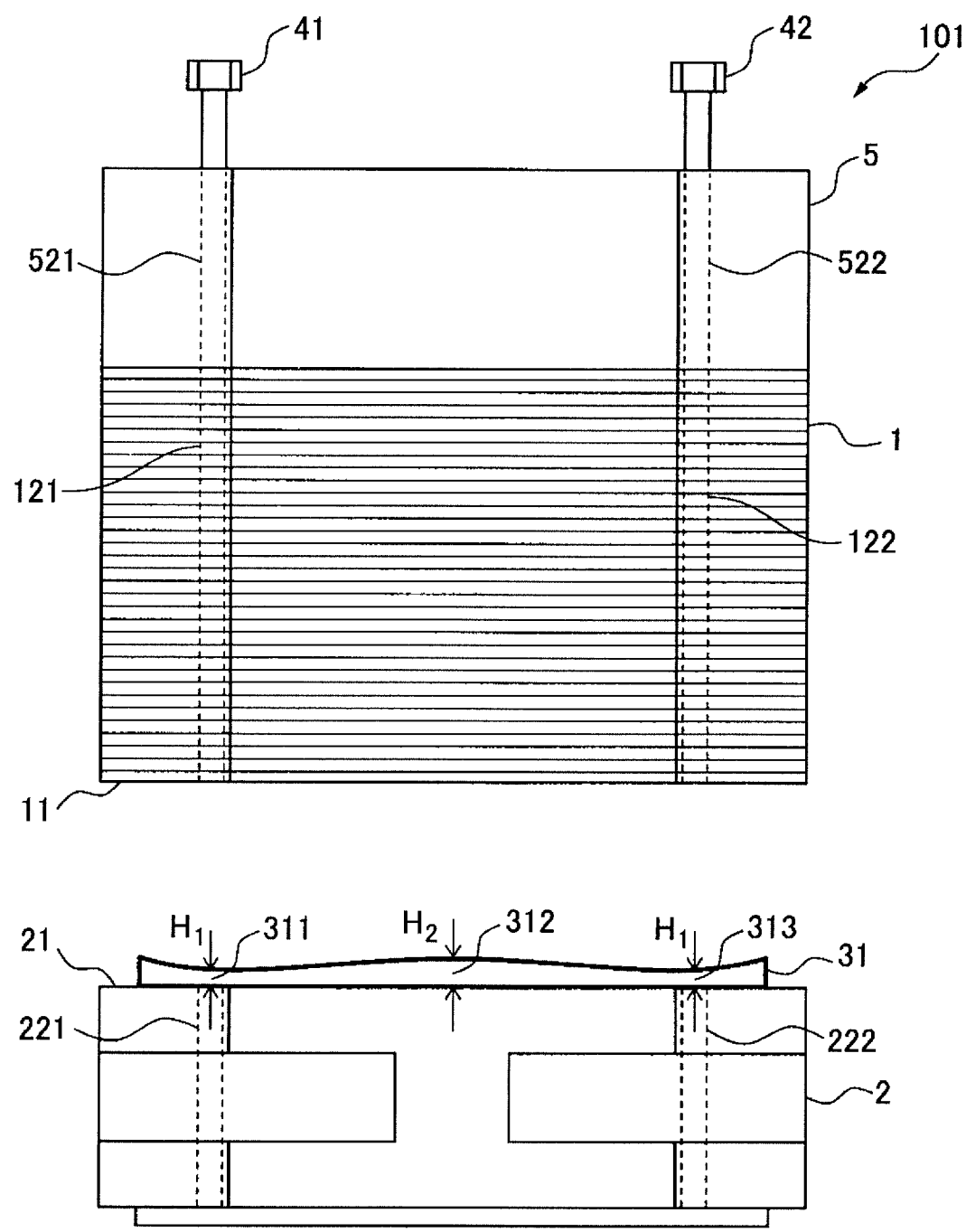
FIG. 2 is a side view of the electric motor according to a first embodiment.

A side view of the electric motor according to the first embodiment as seen from the side of a line A-A in FIG. 1 is illustrated in FIG. 2. The stator 1, the front-side housing 2, and the rear-side housing 5 are fastened by a plurality of fastening members (41 to 44 (43 and 44 are not illustrated)). The fastening members 41 to 44 pass through insertion holes (121 to 124 (123 and 124 are not illustrated)) of the stator 1, insertion holes (221 to 224 (223 and 224 are not illustrated)) of the front-side housing 2, and insertion holes (521 to 524 (523 and 524 are not illustrated)) of the rear-side housing 5. Bolts and nuts can be used as the fastening members (41 to 44).

Figure 3A:
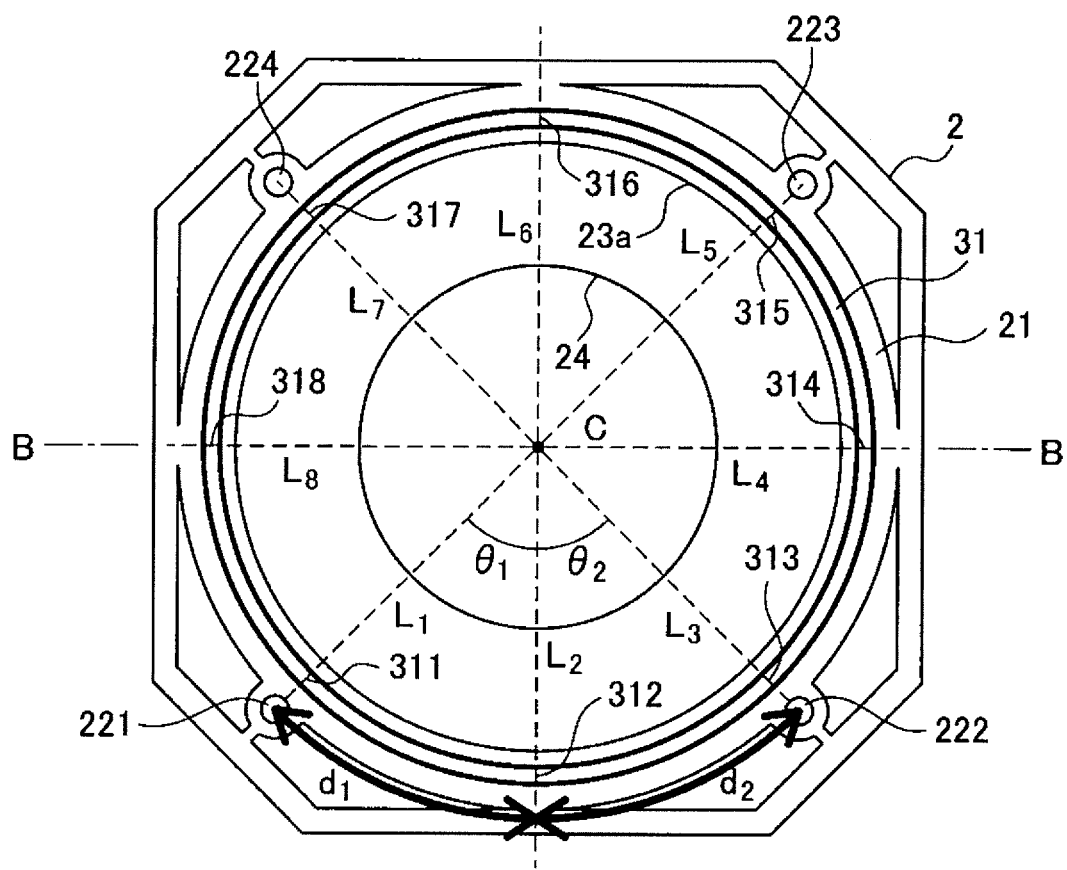
FIG. 3A is a plan view of a front-side housing configuring the electric motor according to the first embodiment.
Figure 3B:
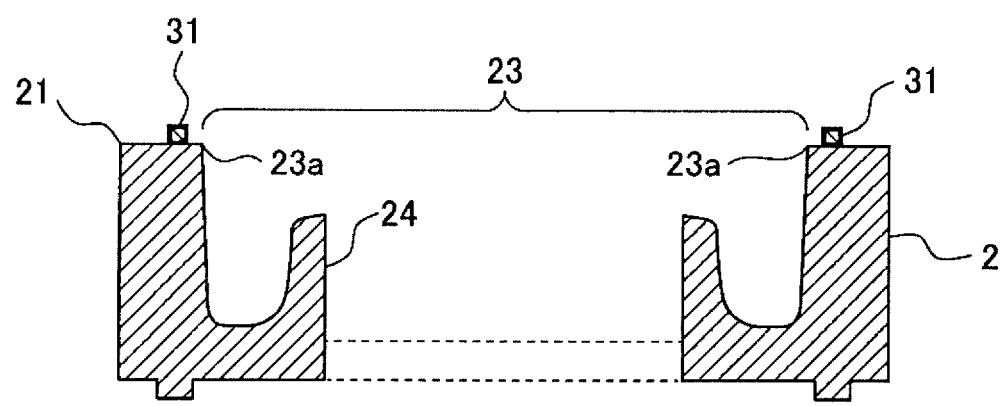
FIG. 3B is a cross-sectional view of the front-side housing configuring the electric motor according to the first embodiment.

FIG. 3A illustrates a plan view of the front-side housing 2 configuring the electric motor according to the first embodiment. FIG. 3B illustrates a cross-sectional view of the front-side housing configuring the electric motor according to the first embodiment, along a line B-B in FIG. 3A. An annular portion 31 having an annular shape that surrounds an opening 23 is disposed on a surface 21 of the front-side housing 2 facing the stator 1. As illustrated in FIG. 3B, the opening 23 is provided on the inside of an opening edge portion 23a. Thus, the annular portion 31 is provided on an outer peripheral portion of the opening edge portion 23a.

In the electric motor 101 according to the first embodiment, a height $H_1$ of each of a plurality of first sections (311, 313, 315, and 317) in the vicinity of the plurality of insertion holes (221 to 224) for the fastening members is lower than a height $H_2$ of each of a plurality of second sections (312, 314, 316, and 318), each of which is a middle point between an adjacent pair of the first sections, among the plurality of first sections, the middle point is close to the adjacent pair of the first sections. In other words, the annular portion 31 has an uneven shape in which a height from the surface 21 of the front-side housing 2 is different depending on a position. As illustrated in FIG. 3A, the height of the first section 311 in the vicinity of the insertion hole 221 for the fastening member is denoted by $H_1$. A location at which a straight line $L_1$ joining the center of the insertion hole 221 and the center C of the annular portion 31 intersects with the annular portion 31 is the first section 311. Similarly, a location at which a straight line $L_3$ joining the center of the insertion hole 222 and the center C of the annular portion 31 intersects with the annular portion 31 is the adjacent first section 313. Further, the height of the second section 312 that is the middle point of the adjacent pair of the first sections (311 and 313), among the plurality of fastening members in the annular portion 31, and that is positioned at the middle point close to the adjacent pair of the first sections (311 and 313) is denoted by $H_2$. Specifically, a location at which a straight line $L_2$ extending from the center C of the annular portion 31 intersects with the annular portion 31 is the second section 312, and the second section 312 is determined such that a length $d_1$ from the first section 311 to the second section 312 is the same as a length $d_2$ from the first section 313 to the second section 312. In other words, when an angle formed between the straight lines $L_1$ and $L_2$ is denoted by $\theta_1$, and an angle formed between the straight lines $L_2$ and $L_3$ is denoted by $\theta_2$, the position of the second section 312 is determined such that $\theta_1$ and $\theta_2$ are the same as each other. When the first section 311 and the second section 312 are in such a positional relationship, unevennesses are formed in the annular portion 31 such that the height $H_1$ of the first section 311 is lower than the height $H_2$ of the second section.

Similarly, when straight lines respectively joining the center C of the annular portion 31 and the centers of the insertion holes 223 and 224 are denoted by $L_5$ and $L_7$, locations at which the straight lines $L_5$ and $L_7$ intersect the annular portion 31 are the other first sections 315 and 317. Further, when locations at which straight lines $L_4$, $L_6$, and $L_8$ extending from the center C of the annular portion 31 intersect with the annular portion 31 are, respectively, the second sections (314, 316, and 318), the second sections (314, 316, and 318) are positioned at the middle points of the adjacent pairs of the first sections ((313 and 315), (315 and 317) and (317 and 311)).

For example, when the four insertion holes (221 to 224) are disposed at positions displaced at 90 degrees from each other, the four first sections (311, 313, 315, and 317) are disposed at positions displaced at 90 degrees from each other, and the four second sections (312, 314, 316, and 318) are disposed at positions displaced at 90 degrees from each other. Further, the four first sections (311, 313, 315, and 317) and the adjacent four second sections (312, 314, 316, and 318) are disposed in positions displaced at 45 degrees from each other.

In the example illustrated in FIG. 3A, the four insertion holes are exemplified. However, the present disclosure is not limited to this example, and two, three, or five or more insertion holes may be provided. When the annular portion 31 provided with the unevennesses is caused to come into contact with and be fastened to the stator 1, the shape of the unevennesses is preferably set such that a surface pressure $P_1$ at the first sections (311, 313, 315, and 317) of the annular portion 31 is the same as a surface pressure $P_2$ at the second sections (312, 314, 316, and 318) of the annular portion 31. This is because, in a case where the unevennesses are not provided in the annular portion, when the fastening members (41 to 44) are inserted through the insertion holes (221 to 224) to fasten the stator 1 and the front-side housing 2, the surface pressure decreases the further away from the insertion holes (221 to 224), and the surface pressure on the annular portion 31 becomes uneven. As with the electric motor according to the first embodiment, by providing the unevennesses in the annular portion 31, the surface pressure on the annular portion when the stator 1 and the front-side housing 2 are fastened together can be made uniform. This is because of the following reasons. When the fastening members (41 to 44) have fastened the stator 1 and the front-side housing 2, a fastening force becomes weaker the further away from the insertion holes (221 to 224). Thus, the surface pressure acting between the stator 1 and the annular portion 31 decreases the further away from the insertion holes (221 to 224). As a result, the surface pressure at the first sections (311, 313, 315, and 317) of the annular portion that are in the vicinity of the insertion holes (221 to 224) is at a maximum, while the surface pressure at the second sections (312, 314, 316, and 318) of the annular portion 31 that are furthest from the insertion holes (221 to 224) is at a minimum. On the other hand, in a case where the regions of different heights are formed on the annular portion 31, when the stator 1 and the front-side housing 2 are fastened together, with respect to a repulsive force received by the annular portion 31 from the stator 1, the repulsive force at the regions of the higher height of the annular portion 31 is greater than the repulsive force at the regions of the lower height of the annular portion 31. In a state in which the height $H_2$ of the annular portion at the second sections (312,

314, 316, and 318) is caused to be higher than the height $H_1$ of the annular portion at the first sections (311, 313, 315, and 317), when the stator 1 and the front-side housing 2 are fastened together, the repulsive force at the second sections (312, 314, 316, and 318) is larger than the repulsive force at the first sections (311, 313, 315, and 317). In this way, the surface pressure that decreases the further away from the insertion holes is compensated for by repulsive force, and thus, an overall surface pressure acting between the stator 1 and the annular portion 31 can be made constant, regardless of the position on the annular portion 31. As a result, it is possible to inhibit the infiltration of cutting fluid, etc., from a bonding surface between the stator 1 and the front-side housing 2.

In FIG. 3A, the example is given in which the shape of the annular portion 31 is circular. However, as long as the annular portion 31 has an annular shape that surrounds the opening 23, it is not limited to is circular.

The annular portion 31 is preferably integrally molded with the front-side housing 2. By the integral molding, a gap formed between the annular portion 31 and the front-side housing 2 can be eliminated.

Further, the annular portion 31 may be made from a material including at least one of iron and aluminum. By adopting this type of configuration, machining of the annular portion 31 can be easily performed.

Alternatively, the annular portion 31 may be made from an elastic material. By adopting this type of configuration, adhesion between the annular portion 31 and the front-side housing 2 can be increased.

Figure 4:
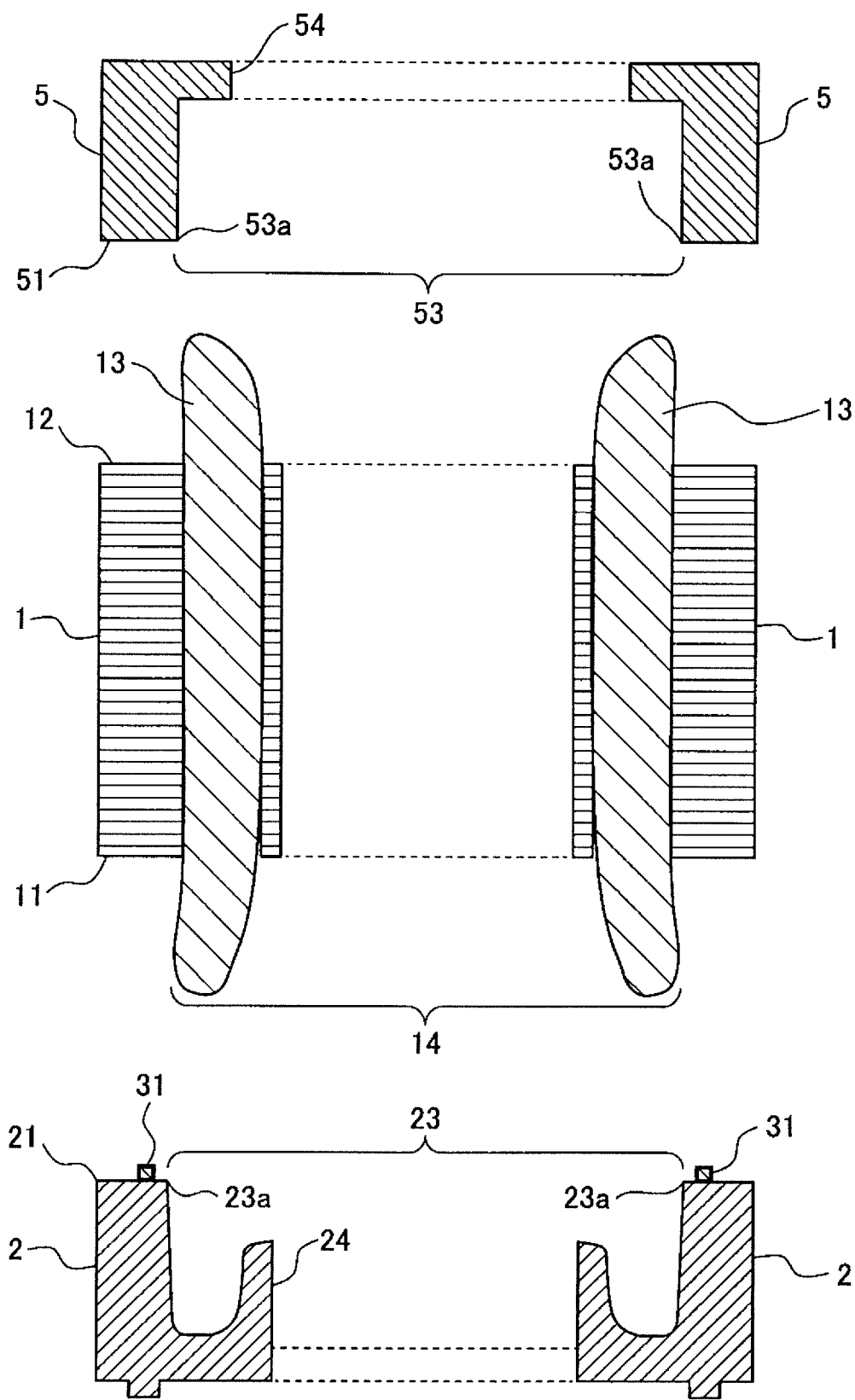
FIG. 4 is a cross-sectional view of the electric motor according to the first embodiment before assembly.

FIG. 4 is a cross-sectional view of the electric motor according to the first embodiment before assembly. A coil 13 is wound around the stator 1, and the coil 13 protrudes to both end sides. In order for the front-side housing 2 to house the coil 13, the width of the opening 23 is wider than a width 14 over which the coil is extended. In order for the coil 13 to also be housed in the rear-side housing 5, a second opening 53 is provided, and the width of the second opening 53 is wider than the width 14 over which the coil is extended.

The surface 21 of the front-side housing 2 faces a surface 11 of the stator. A surface 51 of the rear-side housing 5 faces another surface 12 of the stator.

Figure 5:
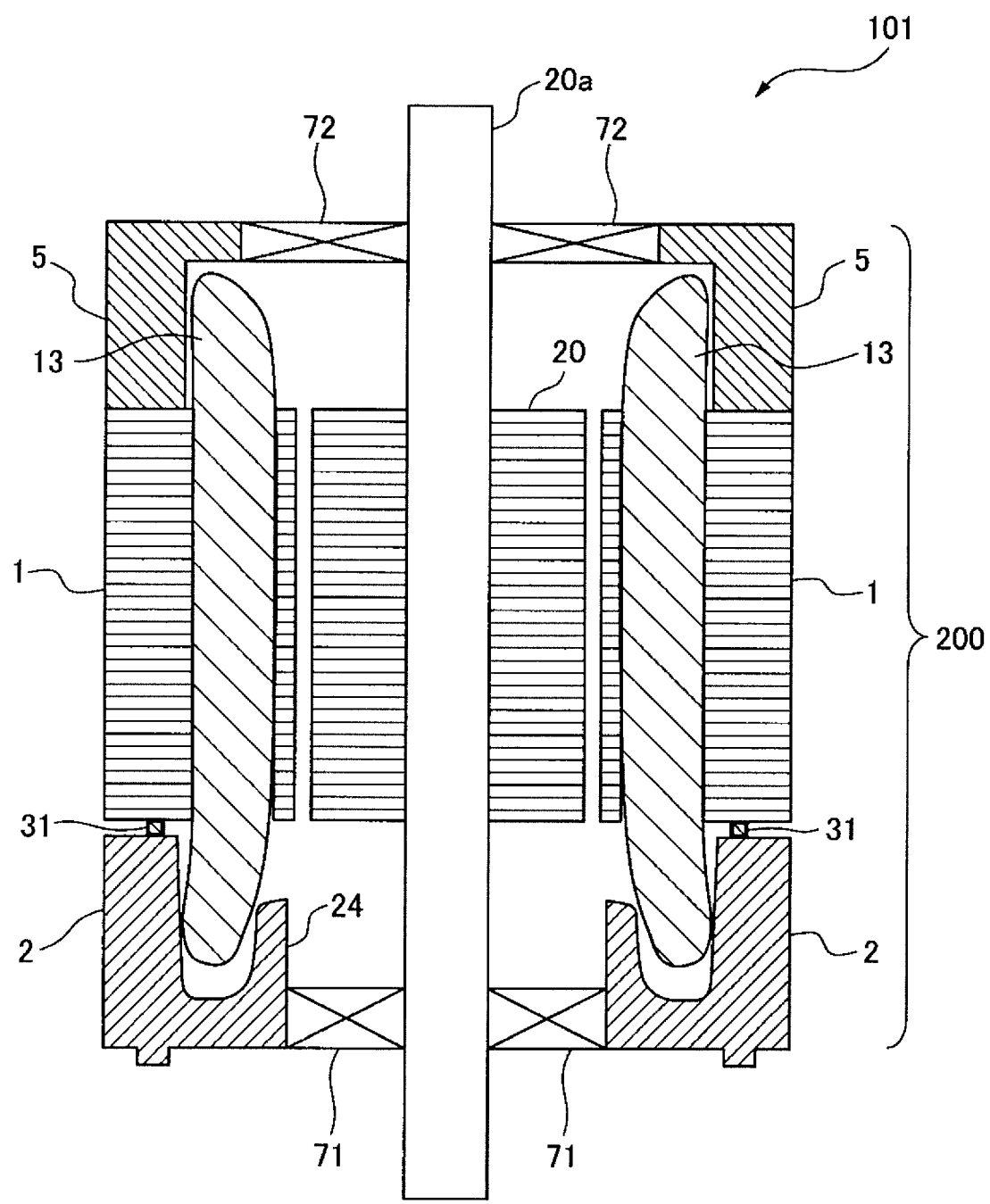
FIG. 5 is a cross-sectional view of the electric motor according to the first embodiment after assembly.

FIG. 5 is a cross-sectional view of the electric motor according to the first embodiment after assembly. A housing 200 integrated with the stator (a stator-integrated housing) is configured by the stator 1, the front-side housing 2, and the rear-side housing 5. A rotor 20 is housed in the interior of the stator-integrated housing 200.

The rotor 20 is configured by a plurality of electromagnetic steel sheets is layered. The output axis 20a of the rotor is held by a bearing 71 provided in the front-side housing 2 and a bearing 72 provided in the rear-side housing 5.

As illustrated in FIG. 5, after the rotor 20 is disposed in the stator-integrated housing 200, the stator 1, the front-side housing 2, and the rear-side housing 5 that configure the stator-integrated housing 200 are fastened together using the fastening members (41 to 44 (see FIG. 2)). By providing the annular portion 31 between the stator 1 and the front-side housing 2 so as to firmly seal the interior of the stator 1 in this way, a contact area is narrower, and the pressure per unit surface area can be increased. In addition, the unevennesses are provided so that, when the stator and the front-side housing 2 are fastened together, the surface pressure acting on the annular portion 31 is uniform, regardless of the position on the annular portion 31. As a result, it is possible to inhibit the infiltration of the cutting fluid, etc., from the bonding surface between the stator and the front-side housing.

Figure 6A:
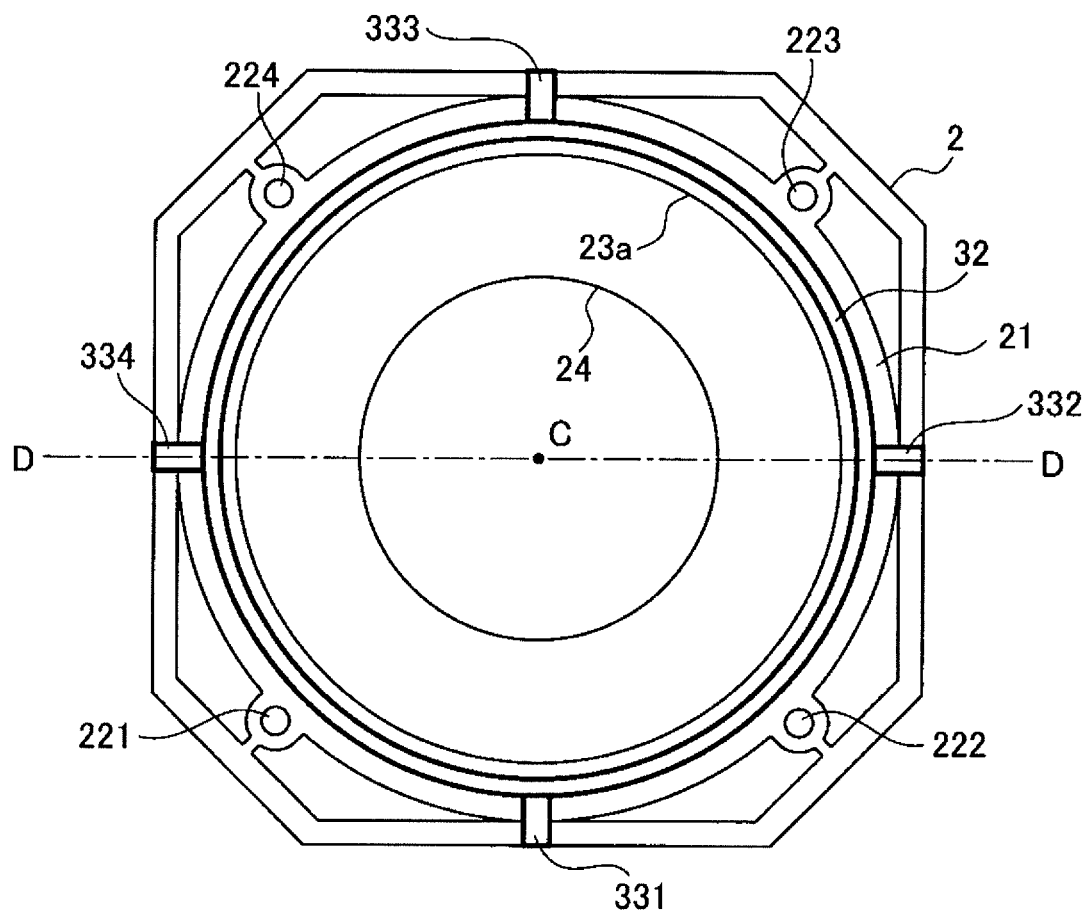
FIG. 6A is a plan view of the front-side housing configuring an electric motor according to a second embodiment.
Figure 6B:
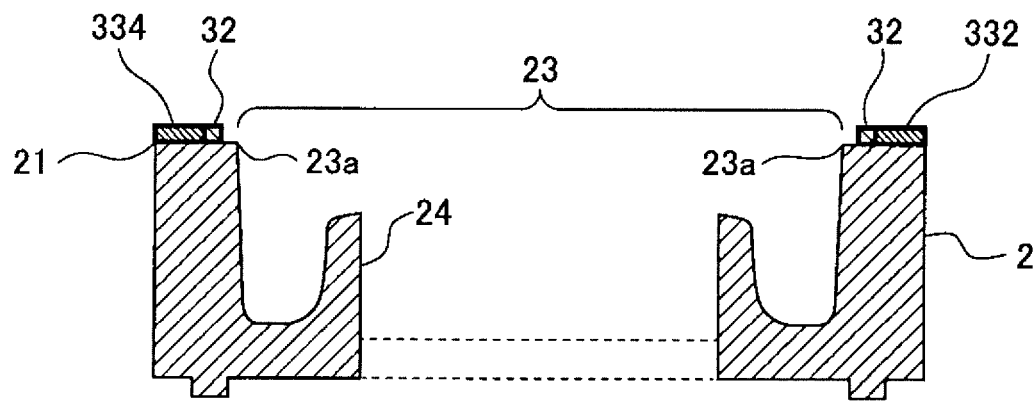
FIG. 6B is a cross-sectional view of the front-side housing configuring the electric motor according to the second embodiment.

Next, the electric motor according to a second embodiment is described. FIG. 6A illustrates a plan view of a front-side housing configuring the electric motor according to the second embodiment. FIG. 6B illustrates a cross-sectional view of the front-side housing configuring the electric motor according to the second embodiment, along a line D-D in FIG. 6A. A difference between the electric motor according to the second embodiment and the electric motor according to the first embodiment is that a plurality of stator pressing portions (331 to 334) are additionally disposed around an outer peripheral portion of an annular portion 32, which come into contact with the stator 1 to suppress deformation of the stator 1 when the stator 1 and the front-side housing 2 are fastened together. Since the rest of the configuration of the electric motor according to the second embodiment is similar to that of the electric motor according to the first embodiment, a detailed description thereof is omitted.

In the electric motor according to the second embodiment, by providing the plurality of stator pressing portions (331 to 334) on the outer peripheral portion of the annular portion 32, when the stator 1 and the front-side housing 2 are fastened together, the plurality of stator pressing portions (331 to 334) can come into contact with the stator 1 to suppress deformation of the stator 1. In other words, in a case where the stator pressing portions (331 to 334) are not provided, when the stator 1 and the front-side housing 2 are fastened together, a large pressure acts on the stator 1 that has come into contact with the annular portion 32, and there is a possibility that the stator 1 may deform. In particular, when the stator 1 is formed by layering the plurality electromagnetic steel sheets, there is a possibility that the electromagnetic steel sheets in contact with the annular portion 32 may bend toward the front-side housing 2. However, by providing the stator pressing portions (331 to 334) on the outer peripheral portion of the annular portion 32 and disposing the annular portion 32 inside the stator pressing portions (331 to 334), as in the present example, when the stator 1 and the front-side housing 2 are fastened together, the deformation of the stator 1 can be suppressed by the stator pressing portions (331 to 334) supporting the stator 1.

In the example illustrated in FIG. 6A, four of the stator pressing portions are exemplified. However, the number of the stator pressing portions may be one to three, or may be five or more.

Further, in the example illustrated in FIG. 6A and FIG. 6B, the stator pressing portions (331 to 334) provided on the outer peripheral side of the annular portion 32 are exemplified. However, the stator pressing portions (331 to 334) may be provided on the inner peripheral side of the annular portion 32, or may be provided on both the inner peripheral side and the outer peripheral side thereof.

In the example illustrated in FIG. 6A and FIG. 6B, the stator pressing portions (331 to 334) are configured independently from the annular portion 32. However, the stator pressing portions (331 to 334) may be integrally formed with the annular portion 32.

The stator pressing portions (331 to 334) are preferably integrally molded with the front-side housing 2. By the integral molding, the positions of the stator pressing portions (331 to 334) on the surface 21 of the front-side housing 2 are fixed, and the annular portion 32 can be easily positioned.

Further, the annular portion 32 and the stator pressing portions (331 to 334) may be made from a material including at least one of iron and aluminum. By adopting this type of configuration, machining of the annular portion 32 and the stator pressing portions (331 to 334) can be easily performed.

The annular portion 32 and the stator pressing portions (331 to 334) may be made from an elastic material. By adopting this type of configuration, adhesion between the annular portion 32 and the stator pressing portions (331 to 334), and the front-side housing 2 can be increased.

Figure 7A:
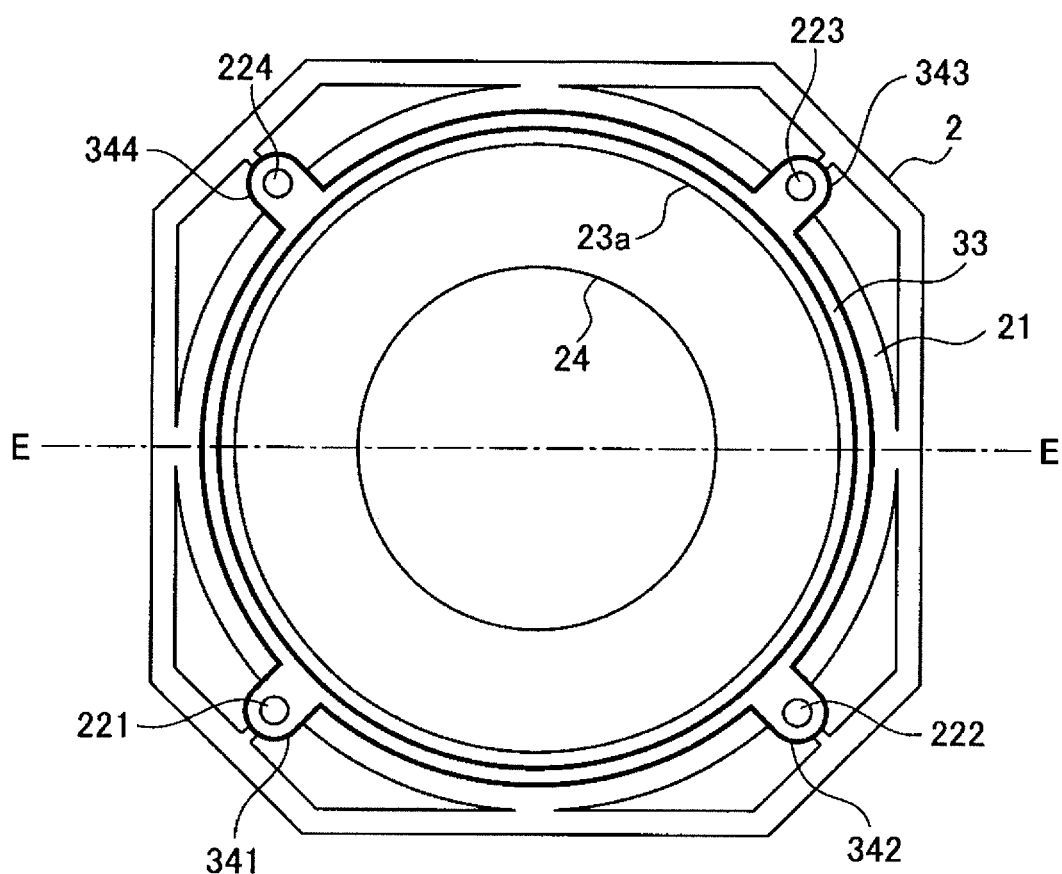
FIG. 7A is a plan view of the front-side housing configuring an electric motor according to a third embodiment.
Figure 7B:
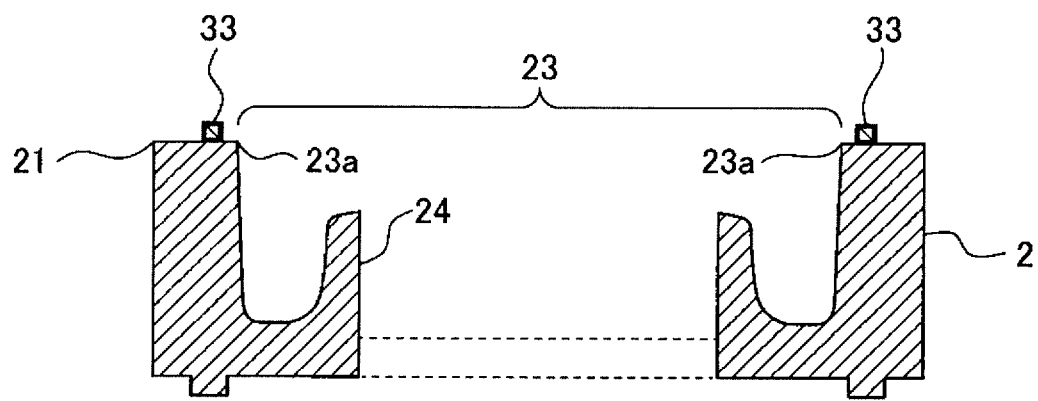
FIG. 7B is a cross-sectional view of the front-side housing configuring the electric motor according to the third embodiment.

Next, an electric motor according to a third embodiment is described. FIG. 7A illustrates a plan view of the front-side housing configuring the electric motor according to the third embodiment. FIG. 7B illustrates a cross-sectional view of the front-side housing configuring the electric motor according to the third embodiment, along a line E-E in FIG. 7A. A difference between the electric motor according to the third embodiment and the electric motor according to the first embodiment is that an annular portion 33 is further provided with holding portions (341 to 344), which are provided with holes that extend around the periphery of the insertion holes (221 to 224) of the fastening members and through which the fastening members pass, and which fix the annular portion 33 to the front-side housing 2. Since the rest of the configuration of the electric motor according to the third embodiment is similar to that of the electric motor according to the first embodiment, a detailed description thereof is omitted.

The holes provided in the holding portions (341 to 344) through which the fastening members pass can be common to the same holes as the insertion holes (221 to 224). By providing the holding portions (341 to 344), positional displacement of the annular portion 33 can be suppressed, and the position of the annular portion 33 can be easily determined. In other words, when the holding portion (341 to 344) are not provided, there is a possibility that the position of the annular portion 33 may be displaced due to vibrations caused by the rotation of the rotor. In a case where the position of the annular portion 33 on the surface 21 of the front-side housing 2 is displaced, there is a possibility that the annular portion 33 cannot cover the peripheral portion of the opening 23, and a possibility that the cutting fluid, etc., may enter into the interior of the stator 1. However, by providing the holding portions (341 to 344) on the periphery of the annular portion 33, as in the present example, and performing positional alignment with the insertion holes (221 to 224) using the holes provided in the holding portions, the annular portion 33 can be disposed so as to cover the peripheral portion of the opening 23. In addition, by making the height of the holding portions (341 to 344) similar to the height of the annular portion 33, the surface pressure acting on the annular portion 33 in the vicinity of the insertion holes at the time of fastening can be dispersed. As a result, it is possible to avoid deformation of the stator 1 and damage to the annular portion 33 caused by a concentration of the surface pressure.

The annular portion 33 and the holding portions (341 to 344) may be integrally molded with the front-side housing 2. By the integral molding, a gap formed between the annular portion 33 and the holding portions (341 to 344), and the front-side housing 2 can be eliminated.

Further, the annular portion 33 and the holding portions (341 to 344) may be made from a material including at least one of iron and aluminum. By adopting this type of configuration, machining of the annular portion 33 and the holding portions (341 to 344) can be easily performed.

The annular portion 33 and the holding portions (341 to 344) may be made from an elastic material. By adopting this type of configuration, adhesion between the annular portion 33 and the holding portions (341 to 344), and the front-side housing 2 can be increased.

Figure 8:
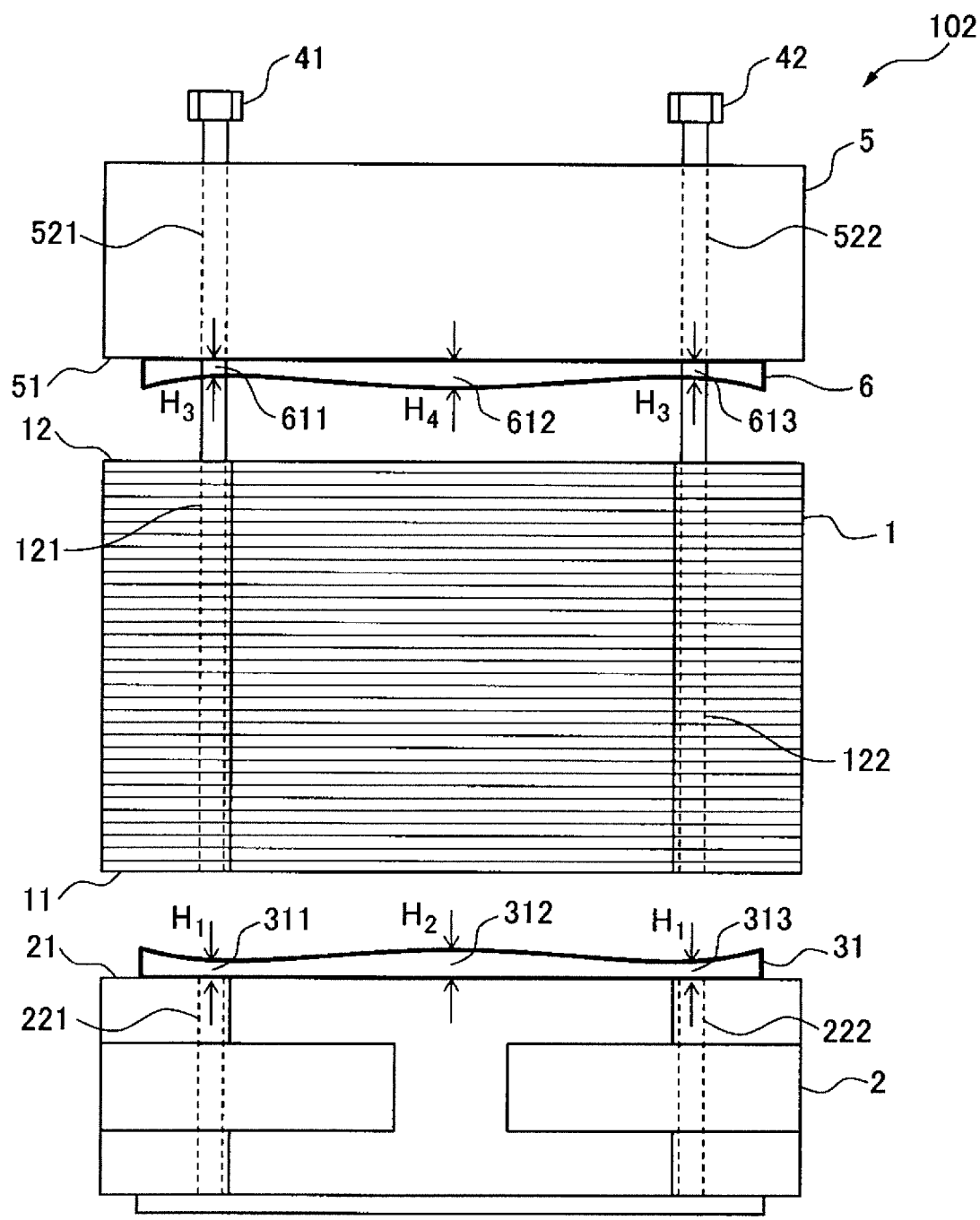
FIG. 8 is a side view of an electric motor according to a fourth embodiment.
Figure 9A:
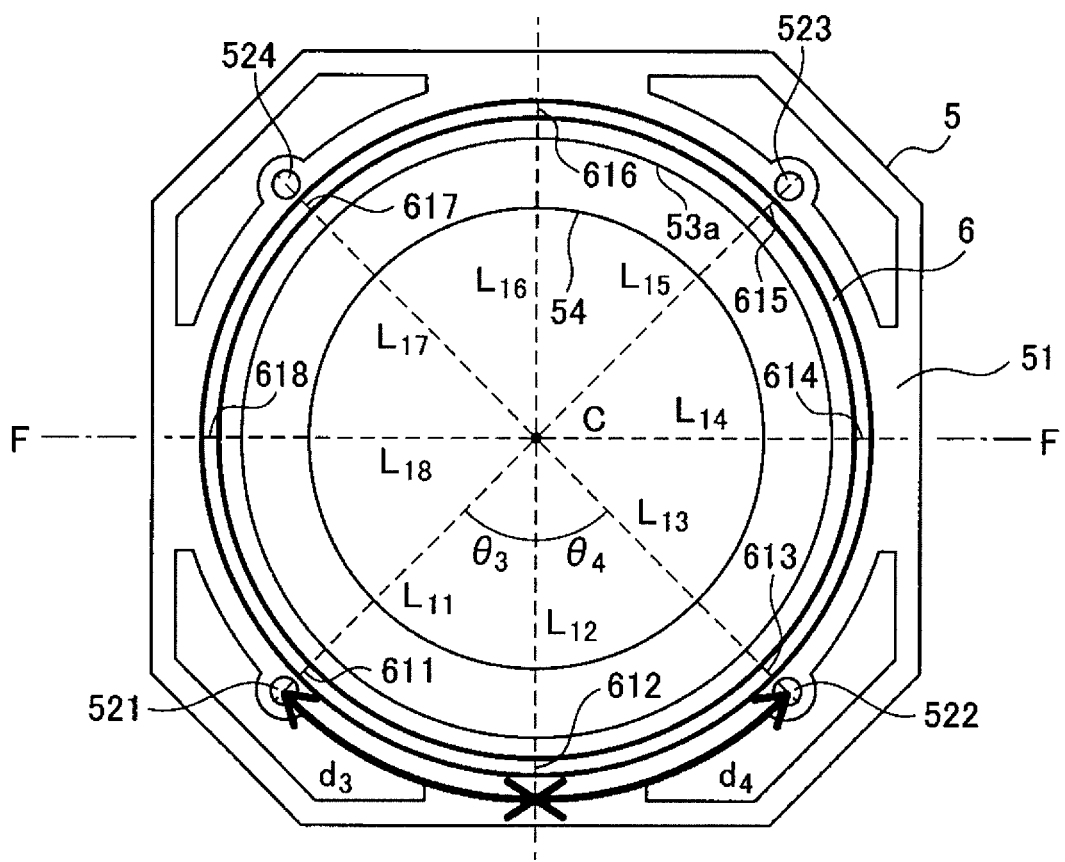
FIG. 9A is a plan view of the rear-side housing configuring the electric motor according to the fourth embodiment.
Figure 9B:
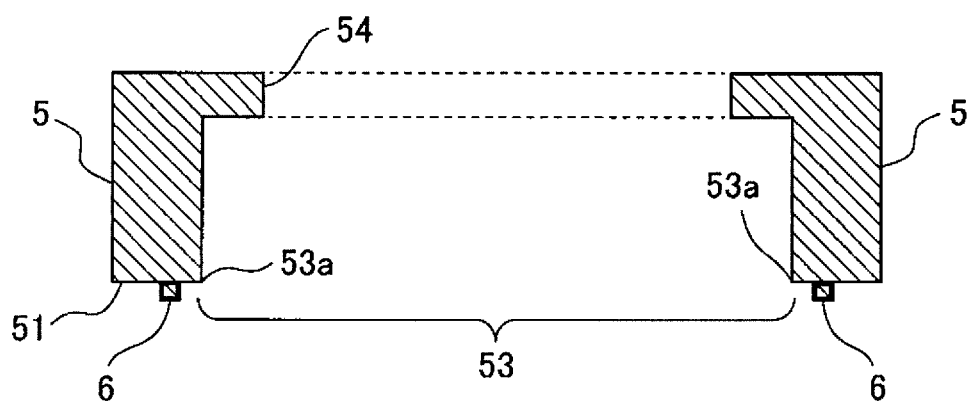
FIG. 9B is a cross-sectional view of the rear-side housing configuring the electric motor according to the fourth embodiment.
Figure 10:
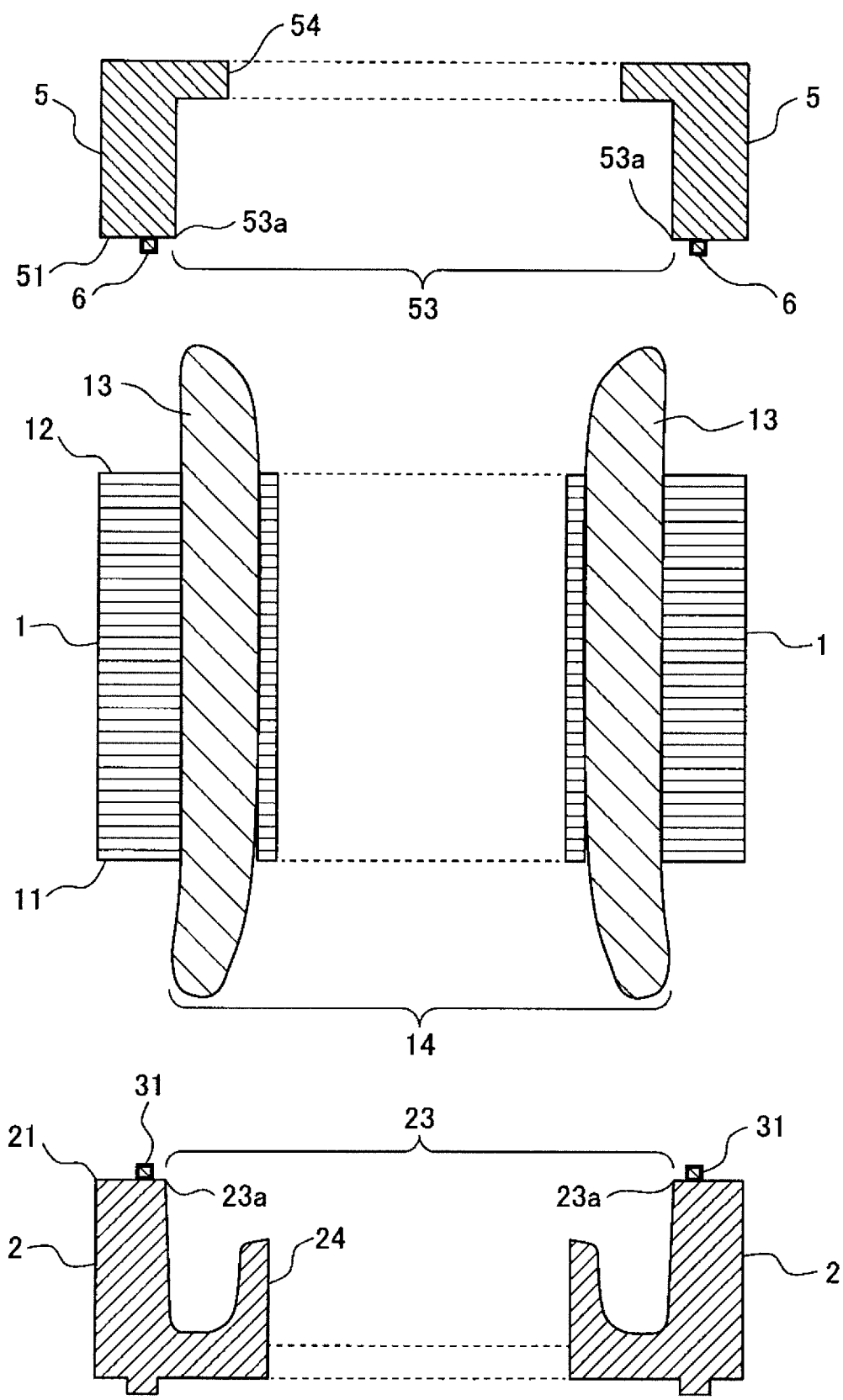
FIG. 10 is a cross-sectional view of the electric motor according to the fourth embodiment before assembly.

Next, an electric motor according to a fourth embodiment is described. FIG. 8 illustrates a side view of an electric motor 102 according to the fourth embodiment. FIG. 9A illustrates a plan view of the rear-side housing 5 configuring the electric motor 102 according to the fourth embodiment. FIG. 9B illustrates a cross-sectional view of the rear-side housing configuring the electric motor 102 according to the fourth embodiment, along a line F-F in FIG. 9A. FIG. 10 illustrates a cross-sectional view of the electric motor 102 according to the fourth embodiment before assembly. FIG. 12 illustrates a cross-sectional view of the electric motor 102 according to the fourth embodiment after assembly. Differences between the electric motor 102 according to the fourth embodiment and the electric motor 101 according to the first embodiment are that a second annular portion 6, which has an annular shape and which surrounds the second opening 53 housing a part of the rotor 20, is disposed on a surface 51 of the rear-side housing 5 that faces the stator 1, and a height of a plurality of third sections (611, 613, 615, and 617) of the second annular portion in the vicinity of a plurality of insertion holes (521 to 524) for the fastening members is lower than a height of a plurality of fourth sections (612, 614, 616, and 618), each of which is a middle point between an adjacent pair of the third sections, among the plurality of third sections, the middle point is close to the adjacent pair of the third sections. Since the rest of the configuration of the electric motor according to the fourth embodiment is similar to that of the electric motor according to the first embodiment, a detailed description thereof is omitted.

In the electric motor 101 according to the first embodiment, the surface 12 of the stator 1 and the surface 51 of the rear-side housing 5 are in direct contact. On the other hand, in the electric motor 102 according to the fourth embodiment, the second annular portion 6 is provided on the surface 51 of the rear-side housing 5, and the stator 1 and the rear-side housing 5 are in contact via the second annular portion 6. The second annular portion 6 is in contact with the surface 12 of the stator 1, and thus, the contact area is made narrower, and the pressure per unit surface area can be increased. Further, unevennesses are provided on the second annular portion 6 in order to make the surface pressure acting on the second annular portion 6 uniform when the stator 1 and the rear-side housing 5 are fastened together.

The second annular portion 6 of the electric motor 102 according to the fourth embodiment includes the unevennesses in which a height from the surface 51 of the rear-side housing 5 is different depending on a position, such that a height $H_3$ of the plurality of third sections (611, 613, 615, and 617) in the vicinity of the plurality of insertion holes (521 to 524) of the fastening members is lower than a height $H_4$ of the plurality of fourth sections (612, 614, 616, and 618), each of which is a middle point between an adjacent pair of the third sections, among the plurality of third sections, the middle point is close to the adjacent pair of the third sections. As illustrated in FIG. 9A, the height of the third section 611 in the vicinity of the insertion hole 521 of the fastening member is denoted by $H_3$ and may be zero. A location at which a straight line $L_{11}$ joining the center of the insertion hole 521 and the center C of the second annular portion 6 intersects with the second annular portion 6 is the third section 611. Similarly, a location at which a straight line $L_{13}$ joining the center of the insertion hole 522 and the center C of the second annular portion 6 intersects with the second annular portion 6 is the adjacent third section 613. Further, the height of the fourth section 612 that is the middle point of the adjacent pair of the third sections (611 and 613), among the plurality of fastening members in the second annular portion 6, and that is positioned at the middle point close to the adjacent pair of the third sections (611 and 613) is denoted by $H_4$. Specifically, a location at which a straight line $L_{12}$ extending from the center C of the second annular portion 6 intersects with the second annular portion 6 is the fourth section 612, and the fourth section 612 is determined such that a length $d_3$ from the third section 611 to the fourth section 612 is the same as a length $d_4$ from the adjacent third section 613 to the fourth section 612. In other words, when an angle formed by $L_{11}$ and $L_{12}$ is denoted by $\theta_3$, and an angle formed by $L_{12}$ and $L_{13}$ is denoted by $\theta_4$, the position of the fourth section 612 is determined such that $\theta_3$ and $\theta_4$ are the same as each other. When the third section 611 and the fourth section 612 are in such a positional relationship, unevennesses are formed in the second annular portion 6 such that the height $H_3$ of the third section 611 is lower than the height $H_4$ of the fourth section 612.

Similarly, when straight lines respectively joining the center C of the second annular portion 6 and the centers of the insertion holes 523 and 524 are denoted by $L_{15}$ and $L_{17}$, locations at which the straight lines $L_{15}$ and $L_{17}$ intersect the second annular portion 6 are the other third sections 615 and 617. Further, when locations at which straight lines $L_{14}$, $L_{16}$, and $L_{18}$ extending from the center C of the second annular portion 6 intersect with the second annular portion 6 are, respectively, the fourth sections (614, 616, and 618), the fourth sections (614, 616, and 618) are positioned at the middle points of the adjacent pairs of the third sections ((613 and 615), (615 and 617) and (617 and 611)).

For example, when the four insertion holes (521 to 524) are disposed at positions displaced at 90 degrees from each other, the four third sections (611, 613, 615, and 617) are disposed at positions displaced at 90 degrees from each other and the four fourth sections (612, 614, 616, and 618) are disposed at positions displaced at 90 degrees from each other. Further, the four third sections (611, 613, 615, and 617) and the adjacent four fourth sections (612, 614, 616, and 618) are disposed in positions displaced at 45 degrees from each other.

In the example illustrated in FIG. 9A, the four insertion holes are exemplified. However, the present disclosure is not limited to this type of example, and two, three, or five or more insertion holes may be provided.

Note that, when the second annular portion 6 provided with the unevennesses is caused to come into contact with and be fastened to the stator 1, the shape of the unevennesses is preferably set such that a surface pressure $P_3$ at the third sections (611, 613, 615, and 617) of the second annular portion 6 is the same as a surface pressure $P_4$ at the fourth sections (612, 614, 616, and 618) of the second annular portion 6. This is because, in a case where the unevennesses are not provided in the second annular portion, when the fastening members are inserted through the insertion holes and the stator 1 and the rear-side housing 5 are fastened, the surface pressure decreases the further away from the insertion holes, and the surface pressure on the second annular portion 6 becomes uneven. As with the electric motor according to the fourth embodiment, by providing the unevennesses on the second annular portion 6, the surface pressure on the second annular portion when the stator 1 and the rear-side housing 5 are fastened together can be made uniform. This is because of the following reasons. When the fastening members have fastened the stator 1 and the rear-side housing 5, a fastening force becomes weaker the further away from the insertion holes (521 to 524). Thus, the surface pressure acting between the stator 1 and the second annular portion 6 decreases the further away from the insertion holes (521 to 524). As a result, the surface pressure at the third sections (611, 613, 615, and 617) of the second annular portion that are in the vicinity of the insertion holes (521 to 524) is at a maximum, while the surface pressure at the fourth sections (612, 614, 616, and 618) of the second annular portion that are furthest from the insertion holes (521 to 524) is at a minimum. The height $H_4$ of the second annular portion at the fourth sections (612, 614, 616, and 618) is higher than the height $H_3$ of the second annular portion at the third sections (611, 613, 615, and 617), and in a case where the stator 1 and the rear-side housing 5 are fastened together such that the height of the fourth sections becomes the same as the height of the third sections, the repulsive force occurring at the fourth sections is larger than the repulsive force occurring at the third sections. In this way, the surface pressure that decreases the further away from the insertion holes is compensated for by the repulsive force, and thus, the surface pressure can be made constant, regardless of the position on the second annular portion. As a result, it is possible to inhibit the infiltration of the cutting fluid, etc., from the bonding surface between the stator 1 and the rear-side housing 5.

In FIG. 9A, the example is given in which the shape of the second annular portion 6 is circular. However, as long as the second annular portion 6 has an annular shape that surrounds the opening 53, it is not limited to is circular.

The second annular portion 6 is preferably integrally molded with the rear-side housing 5. By the integral molding, a gap formed between the second annular portion 6 and the rear-side housing 5 can be eliminated.

Further, the second annular portion 6 may be made from a material including at least one of iron and aluminum. By adopting this type of configuration, machining of the second annular portion 6 can be easily performed.

Alternatively, the second annular portion 6 may be formed from an elastic material. By adopting this type of configuration, adhesion between the second annular portion 6 and the rear-side housing 5 can be increased.

FIG. 10 is a cross-sectional view of the electric motor according to the first embodiment before assembly. The coil 13 is wound around the stator 1, and the coil 13 protrudes to both end sides. In order for the front-side housing 2 to house the coil 13, the width of the opening 23 is wider than the width 14 over which the coil is extended. In order for the coil 13 to also be housed in the rear-side housing 5, the second opening 53 is provided, and the width of the second opening 53 is wider than the width 14 over which the coil is extended.

The surface 21 of the front-side housing 2 faces the surface 11 of the stator. The surface 51 of the rear-side housing 5 faces the other surface 12 of the stator.

Figure 11:
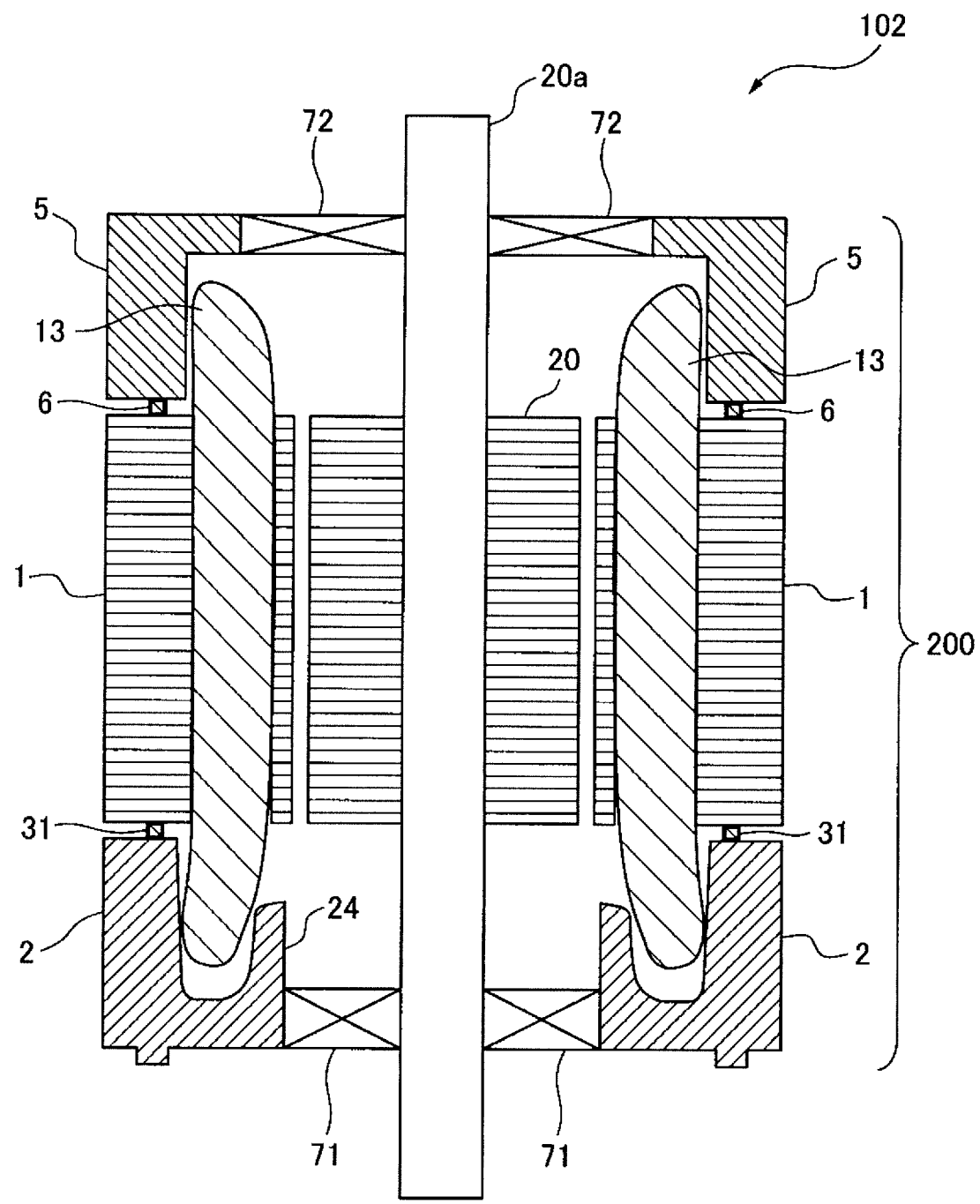
FIG. 11 is a cross-sectional view of the electric motor according to the fourth embodiment after assembly.

FIG. 11 illustrates a cross-sectional view of the electric motor according to the fourth embodiment after assembly. The housing 200 integrated with the stator (the stator-integrated housing) is configured by the stator 1, the front-side housing 2, and the rear-side housing 5. The rotor 20 is housed in the interior of the stator-integrated housing 200.

The rotor 20 is configured by the plurality of electromagnetic steel sheets is layered. The output axis 20a of the rotor is held by the bearing 71 provided in the front-side housing 2 and the bearing 72 provided in the rear-side housing 5.

As illustrated in FIG. 11, after the rotor 20 is disposed in the stator-integrated housing 200, the stator 1, the front-side housing 2, and the rear-side housing 5 that configure the stator-integrated housing 200 are fastened together using the fastening members (41 to 44 (see FIG. 8)). By providing the second annular portion 6 between the stator 1 and the front-side housing 2 so as to firmly seal the interior of the stator 1 in this way, the contact area is narrower, and the pressure per unit surface area can be increased. In addition, the unevennesses are provided so that, when the stator and the front-side housing 2 are fastened together, the surface pressure acting on the second annular portion 6 is uniform, regardless of the position on the second annular portion 6. As a result, it is possible to inhibit the infiltration of the cutting fluid, etc., from the bonding surface between the stator and the front-side housing.

As illustrated in FIG. 9B, the second opening 53 is provided on the inside of an opening edge portion 53a. Thus, the second annular portion 6 is provided on an outer peripheral portion of the opening edge portion 53a.

The second annular portion 6 is preferably integrally molded with the rear-side housing 5. By the integral molding, a gap formed between the second annular portion 6 and the rear-side housing 5 can be eliminated.

Further, the second annular portion 6 may be made from a material including at least one of iron and aluminum. By adopting this type of configuration, machining of the second annular portion 6 can be easily performed.

Alternatively, the second annular portion 6 may be made from an elastic material. By adopting this type of configuration, the adhesion between the second annular portion 6 and the rear-side housing 5 can be increased.

As described above, according to the electric motor according to the present example, it is possible to inhibit the infiltration of the cutting fluid, etc., from the gap between the stator and the housing.

According to the electric motor according to the present example of the present disclosure, it is possible to inhibit the infiltration of the cutting fluid, etc., from the gap between the stator and the housing.

What is claimed is:

1. An electric motor comprising:
   a rotor;
   a stator disposed on an outer peripheral side of the rotor;
   a front-side housing disposed on one side of the stator and provided with an opening housing a part of the rotor;
   a rear-side housing disposed on another side of the stator, the stator is clamped between the rear-side housing and the front-side housing;
   a plurality of fastening members fastening the stator, the front-side housing, and the rear-side housing together; and
   an annular portion formed on a surface of the front-side housing directly adjacent a facing and contacting inner surface of the stator, and the annular portion having an annular shape that surrounds the opening of the front-side housing, wherein the annular portion comprises a continuous undulated surface, and wherein
   respective heights from the undulated surface facing the stator of a plurality of first sections of the annular portion that are in a vicinity of insertion holes of the plurality of fastening members are lower than respective heights from the undulated surface facing the stator of a plurality of second sections of the annular portion, wherein each second section of the plurality of second sections is positioned at a middle point between an adjacent pair of the first sections.

2. The electric motor of claim 1, further comprising:
a plurality of stator pressing portions, which are disposed on an outer peripheral portion of the annular portion, and which, when the stator and the front-side housing are fastened together, come into contact with the stator to suppress deformation of the stator.

3. The electric motor of claim 1, wherein
the annular portion further includes holding portions provided with holes, which extend around the insertion holes of the fastening members when viewed from an axial end across the motor in an axial direction, and through which the fastening members pass, and that fix the annular portion to the front-side housing.

4. The electric motor of claim 1, wherein
a second annular portion is disposed on a surface, of the rear-side housing, that faces the stator, the second annular portion having an annular shape surrounding a second opening that houses a part of the rotor, and
respective heights of a plurality of third sections of the second annular portion that are in the vicinity of the insertion holes of the plurality of fastening members are lower than respective heights of a plurality of fourth sections of the second annular portion, wherein each fourth section of the plurality of fourth sections is positioned at a middle point between an adjacent pair of the third sections.

5. The electric motor of claim 1, wherein
the annular portion is integrally molded with the front-side housing.

6. The electric motor of claim 4, wherein
the second annular portion is integrally molded with the rear-side housing.

7. The electric motor of claim 1, wherein
the annular portion is made from a material including at least one of iron and aluminum.

8. The electric motor of claim 4, wherein
the second annular portion is made from a material including at least one of iron and aluminum.

9. The electric motor of claim 1, wherein
the annular portion is made from an elastic material.

10. The electric motor of claim 4, wherein
the second annular portion is made from an elastic material.

* * * * *